(12) United States Patent
Henze et al.

(10) Patent No.: US 8,318,868 B2
(45) Date of Patent: Nov. 27, 2012

(54) ISOCYANATE-CONTAINING THERMOPLASTIC POLYURETHANE

(75) Inventors: Oliver Steffen Henze, Bremen (DE);
Rolf Steinberger, Schledehausen-Bissendorf (DE);
Ruediger Krech, Diepholz (DE);
Norbert Pohlmann, Nortrup (DE);
Christian Beckmann, Melle (DE);
Joern Duwenhorst, Lemförde (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 13/092,559

(22) Filed: Apr. 22, 2011

(65) Prior Publication Data

US 2011/0193256 A1   Aug. 11, 2011

Related U.S. Application Data

(62) Division of application No. 11/917,631, filed as application No. PCT/EP2006/063232 on Jun. 14, 2006, now abandoned.

(30) Foreign Application Priority Data

Jun. 16, 2005 (DE) .......................... 10 2005 028 056

(51) Int. Cl.
*C08G 18/10* (2006.01)
*C08G 18/08* (2006.01)

(52) U.S. Cl. ...................................................... 525/457
(58) Field of Classification Search .................... 525/457
See application file for complete search history.

(56) References Cited

U.S. PATENT DOCUMENTS

| | | | |
|---|---|---|---|
| 2,432,148 A | 12/1947 | Furness et al. | |
| 3,362,036 A | 1/1968 | Swan et al. | |
| 4,261,946 A | 4/1981 | Goyert et al. | |
| 4,347,338 A | 8/1982 | Torii et al. | |
| 4,485,060 A * | 11/1984 | Franz et al. | 264/102 |
| 5,342,873 A | 8/1994 | Merz et al. | |
| 5,455,312 A * | 10/1995 | Heidingsfeld et al. | 525/457 |
| 5,863,466 A | 1/1999 | Mor | |
| 5,993,972 A | 11/1999 | Reich et al. | |
| 6,142,189 A | 11/2000 | Bhattacharyya | |
| 6,573,341 B2 | 6/2003 | Mühlfeld et al. | |
| 6,660,390 B2 | 12/2003 | Bacon, Jr. | |
| 6,723,333 B1 | 4/2004 | Albers et al. | |
| 6,723,433 B2 | 4/2004 | Bacon, Jr. | |
| 6,747,100 B2 * | 6/2004 | Ichikawa et al. | 473/378 |
| 7,008,333 B2 * | 3/2006 | Takesue et al. | 473/374 |
| 7,267,878 B2 | 9/2007 | Primke et al. | |
| 2002/0115782 A1 | 8/2002 | Brauer et al. | |
| 2002/0164460 A1 | 11/2002 | Bacon | |
| 2002/0192459 A1 | 12/2002 | Bacon | |
| 2003/0130065 A1 | 7/2003 | Watanabe | |
| 2003/0166749 A1 | 9/2003 | Eckstein et al. | |
| 2005/0043492 A1 | 2/2005 | Chin et al. | |
| 2005/0288125 A1 * | 12/2005 | Takesue et al. | 473/371 |
| 2007/0129523 A1 | 6/2007 | Ichihashi et al. | |

FOREIGN PATENT DOCUMENTS

| | | |
|---|---|---|
| DE | 4115508 A1 | 11/1992 |
| DE | 4412329 A1 | 10/1995 |
| DE | 10120567 A1 | 11/2002 |
| EP | 0630926 A2 | 12/1994 |
| EP | 0922719 A1 | 6/1999 |
| EP | 1158011 A1 | 11/2001 |
| GB | 2347933 | 9/2000 |
| JP | 03-203642 A | 9/1991 |
| JP | 04349052 | 12/1992 |
| JP | 06-206963 A | 7/1994 |
| JP | 07-009439 A3 | 1/1995 |
| JP | 2000-159922 A | 6/2000 |
| JP | 2000-351826 A | 12/2000 |
| JP | 2003-073445 A | 3/2003 |
| JP | 2003-190331 A | 7/2003 |
| JP | 2008-194470 A | 8/2008 |
| WO | WO-2005044891 A1 | 5/2005 |

* cited by examiner

Primary Examiner — Randy Gulakowski
Assistant Examiner — Mike M Dollinger
(74) Attorney, Agent, or Firm — Connolly Bove Lodge & Hutz LLP

(57) ABSTRACT

Thermoplastic polyurethane (i) comprising from 20% by weight to 70% by weight of isocyanate dissolved in the thermoplastic polyurethane, based on the total weight of the thermoplastic polyurethane (i) comprising the isocyanates.

15 Claims, No Drawings

ISOCYANATE-CONTAINING THERMOPLASTIC POLYURETHANE

CROSS REFERENCE TO RELATED APPLICATIONS

This application is a Divisional of co-pending application Ser. No. 11/917,631, filed on Dec. 14, 2007, and for which priority is claimed under 35 U.S.C. §120, which is the National Phase of International Application NO. PCT/EP2006/063232 filed Jun. 14, 2006 and claims priority of Application No. 102005028056.0 filed in Germany on Jun. 16, 2005 under 35 U.S.C. §119; the entire contents of all are hereby incorporated by reference.

DESCRIPTION

The invention relates to a thermoplastic polyurethane (i) comprising from 20% by weight to 70% by weight, preferably from 25% by weight to 70% by weight, particularly preferably from 30% by weight to 60% by weight, in particular from 35% by weight to 60% by weight, very particularly preferably from 40% by weight to 60% by weight, especially preferably from 45% by weight to 55% by weight, of isocyanate dissolved in the thermoplastic polyurethane, based on the total weight of the thermoplastic polyurethane (i) comprising the isocyanates, and also to processes for producing these thermoplastic polyurethanes (i) comprising isocyanate, in which preference is given to melting thermoplastic polyurethane and subsequently incorporating the isocyanate into the melt, preferably homogeneously. In addition, the invention relates to processes for producing polyurethanes, in which the production is carried out in the presence of the inventive thermoplastic polyurethanes (i) comprising the isocyanates. Furthermore, the invention relates to processes for reacting thermoplastic polyurethanes with isocyanate, for example in an extruder, in which the inventive thermoplastic polyurethanes (i) comprising isocyanates are used as isocyanate. In addition, the invention relates to processes for injection molding thermoplastic polyurethane, in which thermoplastic polyurethane is injection molded together with the inventive thermoplastic polyurethane (i) comprising isocyanates.

The production of thermoplastic polyurethanes, hereinafter referred to as TPUs for short, is generally known.

TPUs are partially crystalline materials and belong to the class of thermoplastic elastomers. A characteristic of polyurethane elastomers is the segmented structure of the macromolecules. Owing to the differing cohesion energy densities of these segments, a phase separation into crystalline "hard" and amorphous "soft" regions occurs in the ideal case. The resulting two-phase structure determines the property profile of TPUs. Thermoplastic polyurethanes are plastics having a wide range of applications. Thus, TPUs are used, for example, in the automobile industry, e.g. in dashboard skins, in films, in cable sheathing, in the leisure industry, as deposition areas, as functional and design elements in sports shoes, as flexible component in rigid-flexible combinations and in many further applications.

It is known from the literature that the property profile of TPU can be improved by introducing crosslinking into the TPU, leading to the strength being increased, the heat resistance being increased, the tensile and compressive sets being reduced, the resistance to media of all types, resilience and creep behavior being improved.

Known crosslinking methods are, inter alia, UV or electron beam crosslinking, crosslinking via siloxane groups and the formation of crosslinks by addition of isocyanates to the molten TPU. The reaction of a TPU, preferably in the molten state, with compounds bearing isocyanate groups is also referred to as prepolymer crosslinking and is generally known from U.S. 42/61,946, U.S. 43/47,338, DE-A 41 15 508, DE-A 4 412 329, EP-A 922 719, GB 2347933, U.S. 61/42,189, EP-A 1 158 011. Despite this general knowledge of the possible ways of achieving prepolymer crosslinking, this process has hitherto not been able to be implemented in industrial practice. A reason for this is, inter alia, the complicated apparatus. Very homogeneous mixing of the TPU, which is generally in the form of pellets, with the liquid or viscous compounds having isocyanate groups leads to considerable difficulties in practice. Secondly, the reaction of the TPU with the compounds having isocyanate groups also represents a difficult chemical task, since mixing of the molten TPU with diisocyanates can lead to a degradation of the molecular weight of the thermoplastic polyurethanes, while mixing with triisocyanates and polyisocyanates can cause an increase in the molecular weight as far as crosslinking of the thermoplastic polyurethanes in the extruder. In both cases, reliable processing of the polyurethane is made difficult or prevented. On the other hand, very pronounced crosslinking in the end product is sought.

It was an object of the present invention to optimize the chemical components in such a way that very good process reliability, e.g. melt stability, and very pronounced crosslinking can be achieved. In addition, the components should be able to be used, in particular, in injection molding and lead to articles which can be crosslinked.

These objects can be achieved by carrying out the introduction of the isocyanate by means of the concentrates described at the outset, i.e. the inventive TPU (i) comprising isocyanates in high concentration.

The present invention is distinguished from the prior art by, in particular, the substantially simplified handling of the isocyanates. While liquid isocyanates have to be handled in most of the documents cited above, according to the present invention it is possible to add solids in the form of the thermoplastic polyurethanes (i) comprising the isocyanates. The addition of a solid is of particular importance for injection molding. In addition, the adhesion of a thermoplastic polyurethane to other thermoplastic polymers in, in particular, 2-component injection molding has been able to be substantially improved by use of the concentrate (i), either alone or together with further thermoplastic polyurethane, presumably as a result of the free isocyanate groups.

In particular, the solid concentrates (i) offer the advantage that the volatility of the isocyanates is significantly reduced. It has surprisingly been found that a TPU comprising 50% by weight of a prepolymer based on MDI and having an NCO content of 23% and a viscosity of 650 mPas determined in accordance with DIN 53018 was, firstly, free-flowing and, secondly, no volatile MDI could be detected. In addition, the isocyanates are stable in the inventive TPUs (i), i.e. they barely react or do not react at all and are therefore, contrary to expectations, sufficiently storage-stable.

The inventive thermoplastic polyurethanes (i) comprising the isocyanates can thus be used and processed like concentrates. While in the prior art the addition of the isocyanate to the thermoplastic polyurethane is carried out immediately before processing to the end product and crosslinking, according to the invention it is possible to produce a stable concentrate (i) which can be processed only at a significantly later point in time together with further thermoplastic polyurethane to form the end product. A distinction is therefore made in the present text between the concentrates of the invention, i.e. the thermoplastic polyurethane (i) comprising the isocyanate, and the "normal" thermoplastic polyurethanes which do not comprise isocyanates in the amounts according to the invention. The concentrates are denoted by (i) in the present text.

In the thermoplastic polyurethanes (i) of the invention, the isocyanates are present as a solution in the TPU, in particular in the soft phase of the thermoplastic polyurethane. Reaction of the isocyanate with the TPU and thus degradation or crosslinking of the TPU can be avoided, in particular, by a sufficiently low temperature being selected during incorporation. The molecular weight of the TPU usually does not change or changes only very slightly during the incorporation according to the invention of the isocyanates. On the other hand, it is preferred that the thermoplastic polyurethane is molten during the incorporation of the isocyanate in order to be able to reach a very high concentration of isocyanates in the TPU very quickly. The inventive thermoplastic polyurethane (i) comprising isocyanate is preferably stored at a temperature below 40° C. until it is processed.

The concentrate according to the invention, i.e. the TPU (i) comprising the isocyanates, has the additional advantage that no foreign polymer is introduced on addition to the TPU to be crosslinked. Thus, the TPU to be crosslinked can be admixed with the same TPU (i) comprising the isocyanates. Mixtures can thus be avoided, as can substantial adaptations by means of formulation changes, i.e. by addition of a foreign polymer.

The TPUs of the invention, i.e. the thermoplastic polyurethanes (i) comprising the isocyanates, particularly preferably have an NCO content of greater than 5%, preferably greater than 8%, particularly preferably from 10% to 40%.

Here, the NCO content is determined as the sum of isocyanate and allophanate. The sample is for this purpose dissolved in dimethylformamide comprising the amine and maintained at 80° C. for 4 hours. The unreacted excess of amine is backtitrated with acid.

Specifically, the following procedure is employed:

A sample to be tested for isocyanate content is weighed out. The amount weighed out depends on the expected content of isocyanate groups and is weighed to a precision of ±0.001 g. The analysis is carried out as a duplicate determination.

For each analysis, blank determinations without a sample but otherwise completely identical are carried out as a triplicate determination. 20.00 ml of a di-n-hexylamine solution (8.8(±0.01)$_g$ of di-n-hexylamine are made up with DMF to give 2000 ml of solution) are metered by means of a Dosimat 665 (Metrohm Dosimat 665 with a 20 ml burette attachment) into a wide-neck bottle (Schott 250 ml laboratory bottles with screw closure made of PP (blue), DIN thread GL45). 100 ml of DMF are then added by means of a Dispensette and the weighed-out sample is subsequently added. The wide-neck bottle is closed firmly and the solid sample comprised therein is then dissolved by means of a magnetic stirrer bar (magnetic stirrer bar, triangular, l=55 mm) in the firmly closed bottle on an oil bath at 80° on a magnetic stirrer.

In all three cases, the samples are then cooled to room temperature and can then be titrated.

Three drops of indicator solution (bromophenol blue, 1% in DMF) are added to the cooled solutions. The solution is then backtitrated with 0.1 N hydrochloric acid (prepared by making up the content of an ampoule of Titrisol 0.1 mol/l hydrochloric acid to 1 l with 1-butanol) in 1-butanol using a Dosimat 665 (Metrohm Dosimat 665 with 5 ml burette attachment). The end point is reached when the color changes from light green to yellowish greenish yellow. The acid consumption is denoted by "A" in the calculation.

The mean of the amount of acid consumed in the three blank determinations is denoted by "B" in the calculation.

Both analytical values are calculated separately.

Calculation of the total isocyanate content in % of NCO (sum of isocyanate groups and allophanate groups, calculated as NCO):

W=weight of the sample in g (±0.001 g)
B=consumption of acid in the blank test (mean) in ml
A=consumption of acid in the analysis in ml $$\% \text{ of NCO}=(B-A)\times 0.42/W$$

The mean of the duplicate determination is the NCO content of the TPU sample (i).

As isocyanates in the thermoplastic polyurethane (i) of the invention, generally known isocyanates, for example aliphatic, cycloaliphatic and/or aromatic isocyanates generally having 2 isocyanate groups, can be present. Isocyanates of higher functionality, e.g. polymeric MDI or modified isocyanates, for example isocyanates which comprise biuret groups and have from 2 to 10 isocyanate groups, isocyanurates which preferably have from 2 to 8, particularly preferably 3, isocyanate groups, and/or prepolymers which have from 2 to 10 isocyanate groups, i.e. isocyanates, and are obtainable by reacting isocyanates with compounds which are reactive toward isocyanates, generally alcohols, are also possible.

Examples of possible isocyanates are thus trimethylene, tetramethylene, penta-methylene, hexamethylene, heptamethylene and/or octamethylene diisocyanate, 2-methylpentamethylene 1,5-diisocyanate, 2-ethylbutylene 1,4-diisocyanate, penta-methylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcycloxane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethylbiphenyl diisocyanate, 1,2-diphenylethane diisocyanate and/or phenylene diisocyanate.

Preference is given to using MDI, a carbodiimide-modified diphenylmethane 2,2'-, 2,4'- and/or 4,4'-diisocyanate (MDI) and/or a prepolymer based on diphenylmethane 2,2'-, 2,4'- and/or 4,4'-diisocyanate (MDI), triisocyanates or polyisocyanates, in particular biurets or isocyanurates of the isocyanates mentioned, in particular an isocyanurate having an NCO content of from 20% to 25% and a viscosity at 23° C. in the range from 2500 mPas and 4000 mPas, and/or mixtures of diisocyanates and triisocyanates, preferably mixtures (ii) comprising (iia) compounds which have at least three, preferably three, isocyanate groups and are based on aliphatic isocyanates, preferably hexamethylene diisocyanate (HDI) and/or 1-isocyanato-3,3,5-trimethyl-5-isocyanato-methylcyclohexane (isophorone diisocyanate, IPDI), particularly preferably hexamethylene diisocyanate (HDI), and (iib) compounds which have two isocyanate groups and are based on aromatic isocyanates, preferably diphenylmethane 2,2'-, 2,4'- and/or 4,4'-diisocyanate (MDI), particularly preferably diphenylmethane 4,4'-diisocyanate. As (iia), preference is given to using an isocyanurate having three isocyanate groups, preferably an isocyanurate based on HDI, i.e. a trimerized HDI in which three HDI units form an isocyanurate structure and three free isocyanate groups are present. Particular preference is given to using an isocyanurate having an NCO content of from 20% to 25%, preferably from 21.5% to 22.5%, and a viscosity at 23° C. in the range from 2500 mPas and 4000 mPas as (iia). As (iib), preference is given to using diphenylmethane 2,2'-, 2,4'- and/or 4,4'-diisocyanate (MDI), a carbodiimide-modified MDI and/or a prepolymer based on MDI. Particular preference is given to using a prepolymer based on diphenylmethane 2,2'-, 2,4'- and/or 4,4'-diisocyanate (MDI), alkanediol, preferably dipropylene glycol, having a molecular weight of from 60 g/mol to 400 g/mol and polyether diol, preferably polypropylene glycol ether, having a molecular weight of from 500 g/mol to 4000 g/mol as (iib). Particular preference is given to using a prepolymer having a viscosity at 25° C. in the range from 500 mPas to 800 mPas, preferably from 550 mPas to 770 mPas, and an NCO content of from 20% to 25%, preferably from 22.4% to 23.4%, as (iib). (iia) and (iib) are preferably used in a weight ratio of (iia):(iib) of from 1:1 to 1:10, preferably from 1:3 to 1:4.

Particularly preferred isocyanates are diphenylmethane 2,2'-, 2,4'- and/or 4,4'-diiso-cyanate (MDI), a carbodiimide-modified diphenylmethane 2,2'-, 2,4'- and/or 4,4'-diiso-cyanate (MDI), a prepolymer based on diphenylmethane 2,2'-, 2,4'- and/or 4,4'-diiso-cyanate (MDI), preferably a prepolymer having an NCO content of from 20 to 25% and a viscosity at 25° C. of from 500 to 1000 mPas determined in accordance with DIN 53018, isocyanates comprising biuret and/or isocyanurate groups, particularly preferably an isocyanate having an NCO content of from 20% to 25% and a viscosity at 23° C. of from 2500 mPas and 4000 mPas determined in accordance with DIN EN ISO 3219, in particular one based on hexamethylene diisocyanate (HDI).

Particular preference is given to carbodiimide-modified diphenylmethane 4,4'-diisocyanate (MDI), particularly preferably having an isocyanate content of from 25% by weight to 33% by weight, in particular from 29.5% by weight, for example Lupranat® MM 103 (BASF Aktiengesellschaft), prepolymers based on ethylene oxide/propylene oxide, preferably having a molecular weight in the range from 400 to 600 g/mol, in particular $M_w$=450 g/mol, preferably having an isocyanate content in the range from 20 to 28% by weight, in particular 23% by weight, for example Lupranat® MP 102 (BASF Aktiengesellschaft), and/or a trimerized hexamethylene diisocyanate, preferably having an isocyanate content in the range from 20 to 28% by weight, in particular 23% by weight, for example Basonat® HI 100 (BASF Aktiengesellschaft).

To produce the thermoplastic polyurethane (i) comprising the isocyanates, it is possible to use generally known thermoplastic polyurethanes, e.g. ones based on aliphatic or aromatic starting substances. The thermoplastic polyurethanes into which the isocyanates are introduced and which subsequently represent the inventive thermo-plastic polyurethanes (i) comprising the isocyanates can have a generally known hardness. However, preference is given, in particular, to thermoplastic polyurethanes having a Shore hardness of from 80 A to 60 D, particularly preferably from 85 A to 95 A, in particular from 90 A to 95 A, as starting material for producing the concentrates (i). Thermoplastic polyurethanes in the preferred hardness ranges for producing the inventive thermoplastic polyurethanes (i) comprising the isocyanates are optimized in respect of two aspects: firstly, the isocyanate is dissolved predominantly in the soft phase so that the TPU should be as soft as possible in order to dissolve a large amount of isocyanate in the TPU. Secondly, the TPU should be sufficiently free-flowing after the incorporation. This is achieved by the TPU being sufficiently hard for the hard phase to be able to crystallize sufficiently quickly after incorporation of the isocyanate.

The thermoplastic polyurethane (i) comprising the isocyanates is preferably in the form of pellets, preferably pellets having a preferred mean particle diameter of from 0.05 mm to 10 mm, preferably from 1 mm to 5 mm.

The production of the inventive thermoplastic polyurethane (i) comprising isocyanate can be carried out by melting thermoplastic polyurethane and subsequently incorporating the isocyanate into thermoplastic polyurethane melt, preferably homogeneously. The resulting thermoplastic polyurethane melt (i) should preferably have a temperature in the range from 120° C. to 160° C. Particular preference is given to melting the thermoplastic polyurethane at a temperature of from 170° C. to 280° C., preferably from 170 to 240° C., and subsequently mixing the isocyanate at a temperature of from 20 to 80° C. into this melt so that the resulting mixture has a temperature of less than 160° C., preferably in the range from 120° C. to 160° C. Such processing at a target temperature of less than 160° C. offers the advantage that degradation of the thermoplastic polyurethane caused by the addition of diisocyanates or crosslinking of the thermoplastic polyurethane due to the introduction of triiso-cyanates or polyisocyanates can be avoided at this temperature.

The isocyanate can preferably be incorporated into the thermoplastic polyurethane by means of an extruder, preferably by means of a twin-screw extruder.

The product obtainable from the extruder, i.e. the thermoplastic polyurethane (i) comprising isocyanate, can preferably be cooled in a water bath immediately after leaving the die of the extruder and the strand obtained can subsequently be pelletized, for example, by means of generally known methods.

As an alternative, the product obtainable from the extruder, i.e. the TPU melt (i) comprising the isocyanate, can preferably be extruded through a multihole die directly from the extruder into a water bath and subsequently cut up by means of a rotating knife (underwater pelletization). Here, the TPU melt (i) is preferably extruded in the water, preferably through a multihole die, and cut up by means of a rotating knife, preferably in the water.

As indicated at the outset, the invention also provides processes for producing polyurethanes, for example crosslinked or thermoplastic, compact or cellular, rigid, semirigid or flexible polyurethanes which may, if appropriate, comprise urea and/or isocyanurate groups, with the production being carried out in the presence of the thermoplastic polyurethanes (i) of the invention. Here, the thermoplastic polyurethanes (i) comprising the isocyanates are used as isocyanate concentrate, effectively as sole or additional isocyanate component, if appropriate in addition to further customary isocyanates. The production of polyurethanes, for example crosslinked or thermo-plastic, compact or cellular, rigid, semirigid or flexible polyurethanes which may, if appropriate, comprise urea and/or isocyanurate groups is generally known and has been described widely. Processes for producing polyurethanes are usually carried out by reacting (a) isocyanates with (b) compounds which are reactive toward isocyanates, preferably by reacting (a) isocyanates with (b) compounds having hydrogen atoms which are reactive toward isocyanate groups, preferably in the presence of catalysts (d), (f) physical and/or chemical blowing agents and, if appropriate, (e) additives, and are generally known. The process of the invention is distinguished from these known processes by, as indicated, the inventive thermoplastic polyurethanes (i) comprising the isocyanates being used as isocyanate (a).

As described at the outset, the invention also provides, in particular, processes for reacting thermoplastic polyurethanes with isocyanate, with the inventive thermoplastic polyurethane (i) comprising isocyanates being used as isocyanate. In this process, two different thermoplastic polyurethanes are thus used: firstly, the thermoplastic poly-urethane which is usually in pelletized or molten form and is to be crosslinked by the addition of isocyanates and, secondly, the inventive thermoplastic polyurethane (i) comprising the isocyanates, i.e. the isocyanate concentrate, which is added to the TPU to be crosslinked.

As a result of the excess of isocyanate groups produced by the addition of the thermoplastic polyurethane (i) comprising the isocyanates to the thermoplastic polyurethane, these isocyanate groups form crosslinks in the form of, for example, urethane, allophanate, uretdione and/or isocyanurate structures and possibly urea and biuret bonds during and/or after mixing of the TPU with the thermoplastic polyurethane (i) in the cold or preferably hot, particularly preferably molten, state of the components, leading to improved properties of the polyisocyanate polyaddition products. The formation of the crosslinks can, if appropriate, be promoted by addition of catalysts which are generally known for this purpose, for example alkali metal acetates and/or formates. In addition, crosslinking by free isocyanate-reactive groups, e.g. hydroxyl groups of primary or secondary amino groups, in particular hydroxyl groups, of the linear TPU polymer also occurs. These reactive groups can be present originally in the TPU granules, but they are also formed in the TPU melt in the extruder, e.g. by thermal dissociation of the polymer strand under processing conditions or during storage or heating of the isocyanate-rich material.

Preference is given to using from 1 to 70 parts by weight, preferably from 5 to 60 parts by weight, particularly preferably from 10 to 50 parts by weight, of thermoplastic polyurethane (i) comprising isocyanates per 100 parts by weight of thermoplastic polyurethane. The addition of even small proportions of the concentrate can be useful to compensate for fluctuations in the composition of TPU batches by addition of small amounts of isocyanate.

The concentrate (i) is preferably added to the thermoplastic polyurethane by introducing preferably pelletized thermoplastic polyurethane, i.e. the thermoplastic polyurethane into which isocyanate groups are to be introduced by means of the concentrate (i), together with the preferably pelletized thermoplastic polyurethane (i), i.e. the concentrate comprising the isocyanate, into an extruder and melting and mixing them, preferably in the molten state.

As an alternative, it is also possible to introduce the thermoplastic polyurethane into the extruder, melt it and subsequently add concentrate (i), preferably as pellets, to the melt.

The pelletized thermoplastic polyurethane can be introduced together with the thermo-plastic polyurethane (i) into the extruder, preferably by means of a feeding aid. The extruder preferably has a barrier screw.

The preferred use of a feeding aid on the extruder or on the injection-molding apparatus through which the TPU and the thermoplastic polyurethane (i) comprising the isocyanates are fed into the extruder makes it possible to introduce the solid TPU pellets quickly and reliably into the extruder or the injection-molding apparatus, either together with or separately from, preferably together with, the thermoplastic polyurethane (i) comprising the isocyanates. The thermoplastic polyurethane (i) is particularly preferably introduced together with thermoplastic polyurethanes through the feeding aid into the extruder or the injection-molding apparatus, i.e. the same feeding aid is used for the TPU and the thermoplastic polyurethane (i).

The extruder can be a generally known extruder as is generally known, for example, for the extrusion of TPU, e.g. a single- or preferably twin-screw extruder, particularly preferably a single-screw extruder with feeding aid, in particular a grooved feeding aid. These particularly preferred configurations lead to particularly effective and economical mixing and reaction of TPU with the isocyanates comprised in the thermoplastic polyurethane (i).

Feeding aids for extruders are generally known to those skilled in the art of extrusion and have been described widely. The feeding aid is preferably a grooved feed zone. Grooved feeding aids, grooved-barrel extruders or extruders having a grooved feed zone are generally known to those skilled in the art of extruder technology and have been described widely, for example in "Der Extruder im Extrusionsprozeß—Grundlage für Qualität und Wirtschaftlichkeit", VDI-Verlag GmbH, Düsseldorf, 1989, ISBN 3-18-234141-3, pages 13 to 27. A characteristic of a grooved feed zone is the presence of longitudinal grooves in the barrel wall which are usually essentially parallel to the longitudinal extension of the screw in the feed zone of the extruder and usually taper conically in the transport direction to the end of the feed zone.

The grooves preferably have a depth which is in the range from 10% to 90% of the mean particle diameter of the TPU, i.e. the depth of the grooves is significantly smaller than the mean particle diameter of the pelletized TPU. The grooves particularly preferably have a depth of from 1 mm to 8 mm, preferably from 2 mm to 5 mm. The grooved feed zone preferably has a length in the range from 2 times to 4 times the screw diameter. The grooved feed zone preferably has from 4 to 32 grooves, particularly preferably from 4 to 16 grooves, which preferably run parallel or helically, preferably parallel, relative to the longitudinal axis of the extruder.

As screws, it is possible to use generally known screws, e.g. 3- or 5-zone screws. Particular advantages are obtained in the present process when an extruder which has a barrier screw is used. Barrier screws are generally known in extrusion, e.g. from "Der Extruder im Extrusionsprozeß—Grundlage für Qualität und Wirtschaftlichkeit", VDI-Verlag GmbH, Düsseldorf, 1989, ISBN 3-18-234141-3, pages 107 to 125, pages 139 to 143.

The temperature of the melt in the extruder or in the injection-molding apparatus, preferably the extruder, is usually from 150° C. to 240° C., preferably from 180° C. to 230° C.

The residence time of the TPU in the extruder is preferably from 120 s to 600 s.

In addition, the present invention provides processes for injection molding thermo-plastic polyurethane, in which thermoplastic polyurethane to which isocyanate is to be added by means of the concentrate (i) and which is usually to be crosslinked by means of these isocyanate groups after injection molding is injection molded together with the inventive thermoplastic polyurethane (i) comprising isocyanates. The concentrate of the invention, i.e. the thermoplastic polyurethane (i) comprising the isocyanate, has the particular advantage of solids metering for injection molding. The solid concentrates (i) enable liquid isocyanates to be dispensed with. Nevertheless, a high content of free isocyanate groups can be introduced into the injection-molded shaped body by means of the concentrate (i). This content of free isocyanate groups can subsequently be utilized as desired for crosslinking.

In addition, particular preference is given to processes for injection molding thermo-plastic polyurethane, in which thermoplastic polyurethane is injection molded as one component in two-component injection molding together with thermoplastic poly-urethane (i) comprising isocyanates and is preferably injection molded onto a further thermoplastic polymer, preferably in an adhering fashion.

The injection molding of thermoplastic polymers is generally known and has been widely described, in particular for thermoplastic polyurethane, too. Thus, the principle of two-component (2-C) injection molding is shown in FIG. 2 in Simon Amesöder et al., Kunststoffe 9/2003, pages 124 to 129.

The temperature in the injection molding of thermoplastic polyurethane is preferably from 140° C. to 250° C., particularly preferably from 160° C. to 230° C. TPUs are preferably processed under mild conditions. The temperatures can be adapted depending on the hardness. The circumferential velocity during plasticization is preferably less than or equal to 0.2 m/s, and the back pressure is preferably from 30 to 200 bar. The injection velocity is preferably small in order to keep the shear stress low. The cooling time is preferably chosen so as to be sufficiently long, with the hold pressure preferably being from 30 to 80% of the injection pressure. The molds are preferably heated to from 30° C. to 70° C. The gate is preferably chosen at the thickest part of the component. In the case of wide-area overinjections, an injection point cascade can be used.

As further thermoplastic polymers, preferably rigid thermoplastic polymers, it is generally possible to use known further thermoplastic polymers, for example poly-amides, polyesters, polycarbonates, ABS, together with the TPU. Preference is given to firstly producing the molding from a rigid thermoplastic polymer by means of injection molding and subsequently injection molding the thermoplastic polyurethane comprising the concentrate (i) onto this.

The injection-molded articles which can be obtained according to the invention, in particular the articles which preferably comprise polyurethane adhering to a further thermoplastic polymer and can be obtained by two-component injection molding, have the particular advantage that they can be crosslinked via the free isocyanate groups. In addition, due to the isocyanates introduced via the concentrate (i), the thermoplastic polyurethane adheres particularly well to further generally known thermoplastic polymers which are used together with the thermoplastic polyurethane in 2-component injection molding.

The process product according to the invention, i.e. the TPU comprising the thermo-plastic polyurethane (i) with the isocyanate, can be processed by generally known methods, e.g. by means of injection molding or extrusion, to produce moldings of all types, rollers, shoe soles, cladding in automobiles, hoses, cable plugs, bellows, towing cables, wiper blades, cable sheathing, gaskets, belts or damping elements, films or fibers. The processing temperature in production of the films, moldings or fibers is preferably from 150° C. to 230° C., particularly preferably from 180° C. to 220° C. Processing of the mixture to produce the desired films, moldings and/or fibers is preferably carried out immediately after or during the mixing of the TPU with the thermoplastic polyurethane (i), since thermoplastic processing of polyisocyanate polyaddition products to produce films, moldings or fibers is preferably carried out before and/or during formation of the crosslinks.

The process products from extrusion, injection molding or melt spinning, for example the moldings, films or fibers, can subsequently be heat treated/stored at a temperature of, for example, from 20° C. to 100° C. for a period of usually at least 2 hours, preferably from 12 to 48 hours, to form allophanate, uretdione and/or isocyanurate crosslinks, possibly also urea bonds and biurets by hydrolysis, by means of the isocyanate groups present in excess in the polyisocyanate polyaddition products. These crosslinks lead to the very advantageous properties of the products in respect of thermal stability and hysteresis behavior after loading.

Particular preference is also given to processes for producing preferably transparent, preferably printed films, in which a thermoplastic polyurethane is extruded together with the thermoplastic polyurethane (i) comprising isocyanates. The production of films based on TPU is generally known and has been described widely.

Particular preference is given to skis which have these films according to the invention, in particular as supports for the ski decor. These preferably transparent films are printed on the reverse side and subsequently adhesively bonded to the ski support. The advantage of the TPU film is the particularly good abrasion resistance, cold flexibility and high transparency. A ski produced in this way no longer has to be after-treated.

The particular advantage of the films of the invention is particularly apparent in the case of printed films. Here, various printing techniques can be used: thermosublimation printing, screen printing and digital printing. Thermosublimation printing has hitherto not been possible for TPU films. The sublimation dye runs further into the matrix after printing and the printing becomes blurred very quickly. The addition of the TPU concentrate (i) comprising isocyanate to the TPU and thus the incorporation of isocyanate groups into the TPU film enables the migration of the printing ink in the film and thus a blurred printed image to be prevented. This advantage, i.e. the effective prevention of the migration of the dye, is particularly useful when using amine dyes.

Examples of possible binders for dye (donor layer) are: starch, cellulose, agar, porous materials, hydrolyzed PVC-PVA or PVA (EP0531579B1 and U.S. Pat. No. 6,063,842). As dyes, it is possible to use, for example, anthraquinone dyes, monoazo and azomethine dyes (preferably having amino, alkoxy, oxalyl, halogen and cyano groups), leuco bases such as diphenylamines which are oxidized to amino quinones (leuco base=general redox system). Possible binders on paper/carrier film are, for example, ZnO, $CaCO_3$, polyvinyl alcohol, cellulose, metal salts, metal sulfides, $TiO_2$ or $SiO_2$, with this also serving as white pigment for improving the contrast and also as filler to make the material opaque.

The present invention therefore also provides skis which preferably have a transparent, printed, preferably by means of amine dyes, preferably by means of thermosublimation printing, film based on a thermoplastic polyurethane comprising isocyanate, preferably a thermoplastic polyurethane (i) comprising isocyanate, on at least part of their visible surface.

It is possible to use generally known TPUs as TPUs both for producing the inventive TPU (i) and for crosslinking, i.e. for mixing with the inventive thermoplastic poly-urethanes (i) comprising isocyanates. The TPUs can be used in customary form, preferably granulated material or pellets, preferably granulated material, in the process of the invention. TPUs are generally known and have been described widely.

Processes for producing TPU are generally known. For example, the thermoplastic polyurethanes can be produced by reacting (a) isocyanates with (b) compounds which are reactive toward isocyanates and have a molecular weight of from 500 to 10 000 and, if appropriate, (c) chain extenders having a molecular weight of from 50 to 499, if appropriate in the presence of (d) catalysts and/or (e) customary auxiliaries.

The starting components and processes for producing the preferred TPUs are presented below by way of example. The components (a), (b), (c) and, if appropriate, (d) and/or (e) usually used in the production of TPUs are described by way of example below:

a) As organic isocyanates (a), it is possible to use generally known aromatic, aliphatic, cycloaliphatic and/or araliphatic isocyanates, preferably diisocyanates, for example diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethylbiphenyl diisocyanate, 1,2-diphenyl-ethane diisocyanate and/or phenylene diisocyanate, trimethylene, tetra-methylene, pentamethylene, hexamethylene, heptamethylene and/or octa-methylene diisocyanate, 2-methylpentamethylene 1,5-diisocyanate, 2-ethyl-butylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)-cyclohexane (HXDI), cyclohexane 1,4-diisocyanate, 1-methylcyclohexane 2,4- and/or -2,6-diisocyanate and/or dicyclohexylmethane 4,4'-, 2,4'- and 2,2'-diisocyanate, preferably diphenylmethane 2,2'-, 2,4'- and/or 4,4'-diisocyanate (MDI), naphthylene 1,5-diisocyanate (NDI), tolylene 2,4- and/or 2,6-diisocyanate (TDI), hexamethylene diisocyanate and/or IPDI, in particular 4,4'-MDI and/or hexamethylene diisocyanate.

b) As compounds (b) which are reactive toward isocyanates, it is possible to use generally known compounds which are reactive toward isocyanates, for example polyesterols, polyetherols and/or polycarbonatediols, which are usually collectively referred to as "polyols", having molecular weights of from 500 to 12 000 g/mol, preferably from 600 to 6000 g/mol, in particular from 800 to 4000 g/mol, and preferably a mean functionality of from 1.8 to 2.3, preferably from 1.9 to 2.2, in particular 2.

c) As chain extenders (c), it is possible to use generally known aliphatic, araliphatic, aromatic and/or cycloaliphatic compounds having a molecular weight of from 50 to 499, preferably 2-functional compounds, for example diamines and/or alkane-diols having from 2 to 10 carbon atoms in the alkylene radical, in particular 1,4-butanediol, 1,6-hexanediol, and/or dialkylene, trialkylene, tetraalkylene, pentaalkylene, hexaalkylene, heptaalkylene, octaalkylene, nonaalkylene and/or decaalkylene glycols having from 3 to 8 carbon atoms, preferably corresponding oligopropylene glycols and/or polypropylene glycols, with mixtures of chain extenders also being able to be used.

d) Suitable catalysts which, in particular, accelerate the reaction between the NCO groups of the diisocyanates (a) and the hydroxyl groups of the formative components (b) and (c) are the known and customary tertiary amines such as triethylamine, dimethylcyclohexylamine, N-methylmorpholine, N,N'-dimethyl-piperazine, 2-(dimethylaminoethoxy)ethanol, diazabicyclo[2.2.2]octane and the like and also, in particular, organic metal compounds such as titanic esters, iron compounds such as iron(III) acetylacetonate, tin compounds, e.g. tin diacetate, tin dioctoate, tin dilaurate or the dialkyltin salts of aliphatic carboxylic acids, e.g. dibutyltin diacetate, dibutyltin dilaurate or the like. The catalysts are usually used in amounts of from 0.00001 to 0.1 part by weight per 100 parts by weight of polyhydroxyl compound (b).

e) Apart from catalysts (d), customary auxiliaries (e) can also be added to the formative components (a) to (c). Mention may be made of, for example, surface-active substances, flame retardants, nucleating agents, oxidation stabilizers, lubricants and mold release agents, dyes and pigments, stabilizers, e.g. against hydrolysis, light, heat or discoloration, inorganic and/or organic fillers, reinforcing materials and plasticizers. As hydrolysis inhibitors, preference is given to using oligomeric and/or polymeric aliphatic or aromatic carbodiimides. To stabilize the TPUs of the invention against aging, stabilizers are preferably added to the TPU. Stabilizers for the purposes of the present invention are additives which protect the polymer or polymer mixture against damaging environmental influences.

Examples are primary and secondary antioxidants, hindered amine light stabilizers, UV absorbers, hydrolysis inhibitors, quenchers and flame retardants. Examples of commercial stabilizers are given in Plastics Additive Handbook, 5th Edition, H. Zweifel, ed., Hanser Publishers, Munich, 2001 ([1]), p. 98-p. 136. If the TPU of the invention is subjected to thermal oxidative damage during use, antioxidants can be added. Preference is given to using phenolic antioxidants. Examples of phenolic antioxidants are given in Plastics Additive Handbook, 5th edition, H. Zweifel, ed., Hanser Publishers, Munich, 2001, pp. 98-107 and pp. 116-121. Preference is given to phenolic antioxidants whose molecular weight is greater than 700 g/mol. An example of a preferred phenolic antioxidant is pentaerythrityl tetrakis(3-(3,5-bis(1,1-dimethylethyl)-4-hydroxyphenyl)propionate) (Irganox® 1010). The phenolic antioxidants are generally used in concentrations of from 0.1 to 5% by weight, preferably from 0.1 to 2% by weight, in particular from 0.5 to 1.5% by weight, in each case based on the total weight of the TPU. The TPUs are preferably additionally stabilized by means of a UV absorber. UV absorbers are molecules which absorb high-energy UV light and dissipate the energy. Customary UV absorbers which are used in industry belong, for example, to the group of cinnamic esters, diphenylcyanoacrylates, formamidines, benzylidenemalonates, diarylbutadienes, triazines and benzotriazoles. Examples of commercial UV absorbers may be found in the Plastics Additive Handbook, 5th edition, H. Zweifel, ed., Hanser Publishers, Munich, 2001, pages 116-122. In a preferred embodiment, the UV absorbers have a number average molecular weight of greater than 300 g/mol, in particular greater than 390 g/mol. Furthermore, the preferred UV absorbers have a molecular weight of not more than 5000 g/mol, particularly preferably not more than 2000 g/mol. The group of benzotriazoles is particularly useful as UV absorber. Examples of particularly useful benzotriazoles are Tinuvin® 213, Tinuvin® 328, Tinuvin® 571 and Tinuvin® 384 and Eversorb 82. the UV absorbers are preferably added in amounts of form 0.01 to 5% by weight, based on the total mass of TPU, particularly preferably from 0.1 to 2.0% by weight, in particular from 0.2 to 0.5% by weight, in each case based on the total weight of the TPU. An above-described UV stabilization based on an antioxidant and a UV absorber is often not sufficient to ensure good stability of the TPU of the invention in the presence of the damaging influence of UV rays. In this case, a hindered amine light stabilizer (HALS) is preferably added to the component (e), preferably in addition to the antioxidant and the UV absorber, to the TPU of the invention. The activity of HALS compounds is based on their ability to form nitroxyl radicals which interfere in the mechanism of the oxidation of polymers. HALSs are highly efficient UV stabilizers for most polymers. HALS compounds are generally known and commercially available. Examples of commercially available HALSs may be found in the Plastics Additive Handbook, 5th edition, H. Zweifel, Hanser Publishers, Munich, 2001, pp. 123-136. Hindered amine light stabilizers used are preferably hindered amine light stabilizers in which the number average molecular weight is greater than 500 g/mol. Furthermore, the molecular weight of the preferred HALS compounds should preferably be not more than 10 000 g/mol, particularly preferably not more than 5000 g/mol. Particularly preferred hindered amine light stabilizers are bis(1,2,2,6,6-pentamethylpiperidyl) sebacate (Tinuvin® 765, Ciba Spezialitätenchemie AG) and, the condensation product of 1-hydroxyethyl-2,2,6,6-tetramethyl-4-hydroxypiperidine and succinic acid (Tinuvin® 622). Very particular preference is given to the condensation product of 1-hydroxyethyl-2,2,6,6-tetramethyl-4-hydroxypiperidine and succinic acid (Tinuvin® 622) when the titanium content of the product is <150 ppm, preferably <50 ppm particularly preferably <10 ppm. HALS compounds are preferably used in a concentration of form 0.01 to 5% by weight, particularly preferably from 0.1 to 1% by weight, in particular from 0.15 to 0.3% by weight, in each case based on the total weight of the TPU. A particularly preferred UV stabilization comprises a mixture of a phenolic stabilizer, a benzotriazole and an HALS compound in the above-described preferred amounts.

Further details regarding the abovementioned auxiliaries and additives may be found in the specialist literature, e.g. Plastics Additive Handbook, 5th edition, H. Zweifel, ed., Hanser Publishers, Munich, 2001. All molecular weights mentioned in the present text have the units [g/mol].

To set the hardness of the TPUs, the molar ratios of the formative components (b) and (c) can be varied within a relatively wide range. Molar ratios of component (b) to total chain extenders (c) to be used of from 10:1 to 1:10, in particular from 1:1 to 1:4, have been found to be useful, with the hardness of the TPUs increasing with increasing content of (c).

The reaction can be carried out at customary indexes, preferably at an index of from 950 to 1050, particularly preferably at an index in the range from 970 to 1010, in particular from 980 to 995. The index is defined as the molar ratio of the total isocyanate groups of the component (a) used in the reaction to the isocyanate-reactive groups, i.e. the active hydrogens, of the components (b) and (c). At an index of 1000, there is one active hydrogen atom, i.e. one isocyanate-reactive function, of the components (b) and (c) per isocyanate group of the component (a). At indexes above 1000, there are more isocyanate groups than OH groups present. The production of the TPUs can be carried out by known methods either continuously, for example by means of reaction extruders or the belt process by the one-shot or the prepolymer process, or discontinuously by the known prepolymer process. In these processes, the components (a), (b) and, if appropriate, (c), (d) and/or (e) which are reacted can be mixed with one another either in succession or simultaneously, with the reaction commencing immediately. In the extruder process, the formative components (a), (b) and, if appropriate, (c), (d) and/or (e) are introduced individually or as a mixture into the extruder, reacted at, for example, temperatures of from 100° C. to 280° C., preferably from 140° C. to 250° C., and the TPU obtained is extruded, cooled and pelletized.

Owing to the particularly good adhesion, TPUs as described in WO 03/014179, are particularly suitable both for producing the concentrates (i) and for mixing with the concentrate (i). The following information up to the examples is based on this particularly preferred TPU.

These particularly preferred TPUs are preferably obtainable by reacting (a) isocyanates with (b1) polyester diols having a melting point of greater than 150° C., (b2) polyether diols and/or polyester diols in each case having a melting point of less than 150° C. and a molecular weight of from 501 to 8000 g/mol and, if appropriate, (c) diols having a molecular weight of from 62 g/mol to 500 g/mol. Particular preference is given to thermoplastic polyurethanes in which the molar ratio of the diols (c) having a molecular weight of from 62 g/mol to 500 g/mol to the component (b2) is less than 0.2, particularly preferably from 0.1 to 0.01. Particular preference is given to thermoplastic poly-urethanes in which the polyester diols (b1), which preferably have a molecular weight of from 1000 g/mol to 5000 g/mol, comprise the following structural unit (I):

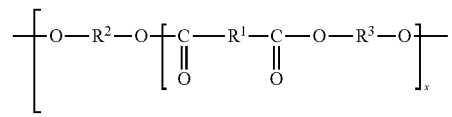

where R1, R2, R3 and X have the following meanings:

R1: carbon skeleton having from 2 to 15 carbon atoms, preferably an alkylene group having from 2 to 15 carbon atoms and/or a divalent aromatic radical having from 6 to 15 carbon atoms, particularly preferably from 6 to 12 carbon atoms, R2: optionally branched alkylene group having from 2 to 8 carbon atoms, preferably from 2 to 6 carbon atoms, particularly preferably from 2 to 4 carbon atoms, in particular —$CH_2$—$CH_2$— and/or —$CH_2$—$CH_2$—$CH_2$—$CH_2$—, R3: optionally branched alkylene group having from 2 to 8 carbon atoms, preferably from 2 to 6 carbon atoms, particularly preferably from 2 to 4 carbon atoms, in particular —$CH_2$—$CH_2$— and/or —$CH_2$—$CH_2$—$CH_2$—$CH_2$—, X: an integer in the range from 5 to 30. The preferred melting point indicated above and/or the preferred molecular weight are in this preferred embodiment based on the structural unit (I) shown.

For the purposes of the present text, the expression "melting point" refers to the maximum of the melting peak of a heating curve measured using a commercial DSC instrument (e.g. DSC 7/from Perkin-Elmer).

The molecular weights reported in the present text are the number average molecular weights in [g/mol].

These particularly preferred thermoplastic polyurethanes can preferably be prepared by reacting a, preferably high molecular weight, preferably partially crystalline, thermoplastic polyester with a diol (c) in a first step (I) and subsequently, in a further reaction (II), reacting the reaction product from (I) comprising (b1) polyester diol having a melting point of greater than 150° C. and, if appropriate, (c) diol together with (b2) polyether diols and/or polyester diols in each case having a melting point of less than 150° C. and a molecular weight of from 501 to 8000 g/mol and, if appropriate, further (c) diols having a molecular weight of from 62 to 500 g/mol with (a) isocyanate, if appropriate in the presence of (d) catalysts and/or (e) auxiliaries.

The molar ratio of the diols (c) having a molecular weight of from 62 g/mol to 500 g/mol to the component (b2) in the reaction (II) is preferably less than 0.2, preferably from 0.1 to 0.01.

While the hard phases are made available for the end product in step (I) by means of the polyester used in step (I), the use of the component (b2) in step (II) results in formation of the soft phases. The preferred technical teaching is that polyesters having a pronounced, readily crystallizing hard phase structure are melted, preferably in a reaction extruder, and firstly degraded by reaction with a low molecular weight diol to form shorter polyesters having free hydroxyl end groups. Here, the original high crystallization tendency of the polyester is retained and can subsequently be utilized in a rapidly occurring reaction to obtain TPUs having the advantageous properties such as high tensile strength, low abrasion values and, because of the high and narrow melting range, high heat distortion resistances and low compression sets. Thus, in the preferred process, preferably high molecular weight, partially crystalline, thermoplastic polyesters are degraded in a short reaction time by reaction with low molecular weight diols (c) under suitable conditions to give rapidly crystallizing polyester diols (b1) which in turn are then incorporated into high molecular weight polymer chains together with other polyester diols and/or polyether diols and diisocyanates.

Here, the thermoplastic polyester used, i.e. before the reaction (I) with the diol (c), preferably has a molecular weight of from 15 000 g/mol to 40 000 g/mol and preferably has a melting point of greater than 160° C., particularly preferably from 170° C. to 260° C.

As starting material, i.e. as polyester, which is reacted in step (I), preferably in the molten state, particularly preferably at a temperature of from 230° C. to 280° C. for a time of preferably from 0.1 min to 4 min, particularly preferably from 0.3 min to 1 min, with the diol(s) (c), it is possible to use generally known, preferably high molecular weight, preferably partially crystalline, thermoplastic polyesters, for example in pelletized form. Suitable polyesters are based, for example, on aliphatic, cycloaliphatic, araliphatic and/or aromatic dicarboxylic acids, for example lactic acid and/or terephthalic acid, and aliphatic, cycloaliphatic, araliphatic and/or aromatic dialcohols, for example 1,2-ethanediol, 1,4-butanediol and/or 1,6-hexanediol.

Particularly preferred polyesters are: poly-L-lactic acid and/or polyalkylene terephthalate, for example polyethylene terephthalate, polypropylene terephthalate, polybutylene terephthalate, in particular polybutylene terephthalate.

The preparation of these esters from the starting materials mentioned is generally known to those skilled in the art and has been described widely. In addition, suitable polyesters are commercially available.

The thermoplastic polyester is preferably melted at a temperature of from 180° C. to 270° C. The reaction (I) with the diol (c) is preferably carried out at a temperature of from 230° C. to 280° C., preferably from 240° C. to 280° C.

As diol (c) for reaction with the thermoplastic polyester in step (I) and if appropriate in step (II), it is possible to use generally known diols having a molecular weight of from 62 to 500 g/mol, for example the diols mentioned at a later point, e.g. ethylene glycol, 1,3-propanediol, 1,4-butanediol, 1,5-pentanediol, 1,6-hexanediol, heptanediol, octanediol, preferably 1,4-butanediol and/or 1,2-ethanediol.

The weight ratio of the thermoplastic polyester to the diol (c) in step (I) is usually from 100:1.0 to 100:10, preferably from 100:1.5 to 100:8.0.

The reaction of the thermoplastic polyester with the diol (c) in reaction step (I) is preferably carried out in the presence of customary catalysts, for example those which are described at a later point. Preference is given to using catalysts based on metals for this reaction. The reaction in step (I) is preferably carried out in the presence of from 0.1 to 2% by weight of catalysts, based on the weight of the diol (c). The reaction in the presence of such catalysts is advantageous in order to enable the reaction to be carried out in the short residence time available in the reactor, for example a reaction extruder.

Possible catalysts for this reaction step (I) are, for example: tetrabutyl orthotitanate and/or tin(II) dioctoate, preferably tin dioctoate.

The polyester diol (b1) as reaction product from (I) preferably has a molecular weight of from 1000 g/mol to 5000 g/mol. The melting point of the polyester diol as reaction product from (I) is preferably from 150° C. to 260° C., in particular from 165° C. to 245° C., i.e. the reaction product of the thermoplastic polyester with the diol (c) in step (I) comprises compounds which have the melting point mentioned and are used in the subsequent step (II).

In the reaction of the thermoplastic polyester with the diol (c) in step (I), the polymer chain of the polyester is cleaved by transesterification by means of the diol (c). The reaction product of the thermoplastic polyester therefore has free hydroxyl end groups and is preferably processed further in the further step (II) to give the actual product, viz. the TPU.

The reaction of the reaction product from step (I) in step (II) is preferably carried out by addition of a a) isocyanate (a) and (b2) polyether diols and/or polyester diols in each case having a melting point of less than 150° C. and a molecular weight of from 501 to 8000 g/mol and, if appropriate, further diols (c) having a molecular weight of from 62 to 500, (d) catalysts and/or (e) auxiliaries to the reaction product from (I). The reaction of the reaction product with the isocyanate occurs via the hydroxyl end groups formed in step (I). The reaction in step (II) is preferably carried out at a temperature of from 190° C. to 250° C. for a time of preferably from 0.5 to 5 min, particularly preferably from 0.5 to 2 min, preferably in a reaction extruder, particularly preferably in the same reaction extruder in which step (I) has also been carried out. For example, the reaction of step (I) can be carried out in the first barrel section of a customary reaction extruder and the corresponding reaction of step (II) can be carried out at a later point, i.e. later barrel sections, after addition of the components (a) and (b2). For example, the first 30-50% of the length of the reaction extruder can be used for step (I) and the remaining 50-70% can be used for step (II).

The reaction in step (II) is preferably carried out at an excess of isocyanate groups over the groups which are reactive toward isocyanates. The ratio of isocyanate groups to hydroxyl groups in the reaction (II) is preferably from 1:1 to 1.2:1, particularly preferably from 1.02:1 to 1.2:1.

The reactions (I) and (II) are preferably carried out in a generally known reaction extruder. Such reaction extruders are described, for example, in the company brochure of Werner & Pfleiderer or in DE-A 2 302 564.

The preferred process is preferably carried out by metering at least one thermoplastic polyester, e.g. polybutylene terephthalate, into the first barrel section of a reaction extruder and melting it at temperatures of preferably from 180° C. to 270° C., preferably from 240° C. to 270° C., adding a diol (c), e.g. butanediol, and preferably a trans-esterification catalyst in a subsequent barrel section, degrading the polyester by reaction with the diol (c) at temperatures of from 240° C. to 280° C. to form polyester oligomers having hydroxyl end groups and molecular weights of from 1000 to 5000 g/mol, adding isocyanate (a) and (b2) compounds which are reactive toward isocyanates and have a molecular weight of from 501 to 8000 g/mol and, if appropriate, (c) diols having a molecular weight of from 62 to 500, (d) catalysts and/or (e) auxiliaries in a subsequent barrel section and subsequently carrying out the formation of the preferred thermoplastic polyurethanes at temperatures of from 190° C. to 250° C.

In step (II), preference is given to feeding in no diols (c) having a molecular weight of from 62 to 500 apart from the diols (c) present in the reaction product from (I).

The reaction extruder preferably has neutral and/or backward-transporting kneading blocks and back-transporting elements, preferably screw mixing elements, toothed disks and/or toothed mixing elements in combination with back-transporting elements, in the region in which the thermoplastic polyester is melted and also in the region in which the thermoplastic polyester is reacted with the diol.

After the reaction extruder, the clear melt is usually conveyed by means of a gear pump to underwater pelletization and pelletized.

The particularly preferred thermoplastic polyurethanes give optically clear, single-phase melts which solidify rapidly and, owing to the partial crystalline polyester hard phase, form slightly opaque to opaque white moldings. The rapid solidification behavior is an important advantage compared to known formulations and production processes for thermoplastic polyurethanes. The rapid solidification behavior is so pronounced that even products having hardnesses of from 50 to 60 Shore A can be processed by injection molding with cycle times of less than 35 s. In extrusion too, e.g. in blown film production, no problems typical of TPUs, e.g. conglutination or blocking of the films or film bubbles, occur.

The proportion of thermoplastic polyester in the end product, i.e. the thermoplastic polyurethane, is preferably from 5 to 75% by weight. The preferred thermoplastic polyurethanes are particularly preferably products of the reaction of a mixture comprising form 10 to 70% by weight of the reaction product from (I), from 10 to 80% by weight of (b2) and from 10 to 20% by weight of (a), with the percentages by weight being based on the total weight of the mixture comprising (a), (b2), (d), (e) and the reaction product from (I).

The preferred thermoplastic polyurethanes preferably have a hardness of from Shore 45 A to Shore 78 D, particularly preferably from 50 A to 75 D.

The preferred thermoplastic polyurethanes preferably comprise the following structural unit (II):

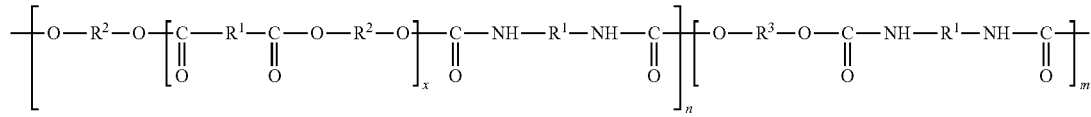

where R1, R2, R3 and X have the following meanings:
R1: carbon skeleton having from 2 to 15 carbon atoms, preferably an alkylene group having from 2 to 15 carbon atoms and/or an aromatic radical having from 6 to 15 carbon atoms,
R2: optionally branched alkylene group having from 2 to 8 carbon atoms, preferably from 2 to 6 carbon atoms, particularly preferably from 2 to 4 carbon atoms, in particular —$CH_2$—$CH_2$— and/or —$CH_2$—$CH_2$—$CH_2$—$CH_2$—,
R3: a radical which is formed by use of polyether diols and/or polyester diols in each case having molecular weights of from 501 g/mol to 8000 g/mol as (b2) or by use of alkanediols having from 2 to 12 carbon atoms for the reaction with diisocyanates,
X: an integer in the range from 5 to 30,
n, m: each an integer in the range from 5 to 20.

The radical R1 is defined by the isocyanate used, the radical R2 is defined by the reaction product of the thermoplastic polyester with the diol (c) in (I) and the radical R3 is defined by the starting components (b2) and, if appropriate, (c) in the production of the TPU.

EXAMPLES

In the examples described below, the following isocyanates and thermoplastic polyurethanes (TPUs) were used:
Isocyanates:
Lupranat® MM 103: Carbodiimide-modified diphenylmethane 4,4'-diisocyanate (MDI);
  NCO content: 29.5% by weight
Lupranat® MP 102: Prepolymer based on MDI, dipropylene glycol and a polyether diol based on ethylene oxide/propylene oxide having a molecular weight of 450;
  NCO content: 23.0% by weight
Basonat® H 100: Trimerized hexamethylene diisocyanate;
  NCO content: 22.0% by weight Thermoplastic polyurethanes (TPUs):
Elastollan® C 78 A, C 80 A, C 85 A: Polyester polyurethanes based on MDI, 1,4-butanediol as chain extender and polyester diol (butanediol-hexanediol-adipic acid copolyester) having a molecular weight of 2000.
Elastollan® 1195 A, 1154 D, 1174 D: Polyether polyurethanes based on MDI, 1,4-butanediol as chain extender and polytetramethylene glycol having a molecular weight of 1000.
Elastollan® C85 A 15 HPM: Hard phase-modified polyester polyurethane based on MDI, 1,4-butanediol, polyester diol as in the case of Elastollan® C grades and a polybutylene terephthalate segment as hard phase.

Example 1 polyurethanes (i) according to claim 1, a twin-screw extruder model ZE 40 A from Berstorff having a process section length of 35 D divided into 10 barrels was used. The screw element arrangement had two backward-conveying kneading blocks as melting unit for the TPU pellets in barrel 2. Barrel 3 comprised a facility for adding liquid isocyanates to the TPU melt. Barrels 3, 6 and 7 had mixing elements in the form of serrated disk blocks in addition to conventional transport elements.

The barrel temperatures were initially all set to 210° C. and 15.0 kg/h of Elastollan® C 85 A pellets were fed continuously by gravimetric metering into barrel 1. 5.0 kg/h of Lupranat® MM 103 were then introduced continuously into the TPU melt by means of a gear pump and gravimetric metering into barrel 3 and intensively mixed in in the subsequent barrels. After the addition of Lupranat® MM 103, all further barrel temperatures from barrel 4 onward were reduced to 150° C. After the optically clear strands of melt leaving the extruder die head had reached temperatures of 150-160° C., they were cooled in a water bath, freed of adhering water in an extraction apparatus and pelletized in the usual way. This resulted in hard, nonsticky granules which crystallized readily and could be used without after-drying (concentrate No. 1).

Example 2

Using the same extruder setup and the same mode of operation, 12.0 kg/h of Elastollan C 85 A were mixed with 8.0 kg/h of a liquid isocyanate mixture of 80% of Lupranat® MP 102 and 20% of Basonat® H 100 and pelletized. (Concentrate No. 2)

TABLE 1

| Concen-trate | Composition | NCO content (% by weight) | |
|---|---|---|---|
| | | theoretical | found |
| No. 1 | EC 85 A + 25% of Lupranat ® MM 103 | 7.5 | 7.0 |
| No. 2 | EC 85 A + 32% of Lupranat ® MP 102 + 8% of Basonat ® M 100 | 9.1 | 8.7 |

The reduced NCO content determined by analysis can be explained by water remaining in the pelletized material in an amount of 0.05-0.15% by weight leading to a reduction in the NCO content by reacting with NCO groups.

Example 3

To produce the inventive thermoplastic polyurethanes (i) according to claim 1, a twin-screw extruder model ZSK 58 from Werner & Pfleiderer having a process section length of 48 D divided into 12 barrels was used. The melt was discharged from the extruder by means of a heated gear pump, and pelletization was effected by means of a conventional underwater pelletization apparatus (UWP). The screw element arrangement corresponded to the arrangement described in example 1.

All barrel temperatures were initially set to 210° C. and 75.0 kg/h of Elastollan® C 85 A were continuously metered gravimetrically into barrel 1, melted, discharged from the extruder via the gear pump which had likewise been heated to 210° C. and pelletized in the UWP in order to determine the molecular weight of the extruded EC 85 A material.

75.0 kg of Lupranat® MP 102 were then continuously added gravimetrically to the TPU melt in barrel 5, mixed in and discharged without reducing the temperature. Owing to the extraordinarily low melt viscosity, underwater pelletization was not possible. However, a sample was taken in order to determine the molecular weight reduction (concentrate No. 3).

The barrel temperatures after barrel 5 and the temperature of the gear pump were subsequently reduced to 140° C. After the optically clear melt being discharged had likewise reached temperatures of 140-145° C., problem-free underwater pelletization was possible. The pellets obtained were freed of water adhering to the surface in a centrifuge and collected without further drying (concentrate No. 4).

TABLE 2

| Concentrate | Composition | NCO content (% by weight) theoretical | NCO content (% by weight) found | Molecular weight Mn in dalton |
|---|---|---|---|---|
|  | EC 85 A extruded at melt temperature of 210° C. | — | 0.10 | 34900 |
| No. 3 | EC 85 A + 50% of Lupranat ® MP 102 extruded at melt temperature of 210° C. | 11.5 | 10.8 | 15000 |
| No. 4 | EC 85 A + 50% of Lupranat ® MP 102 extruded at melt temperature of 140° C. | 11.5 | 9.9 | 33100 |

The molecular weights Mn were determined in a customary way by means of gel permeation chromatography using dimethylformamide as solvent/eluent and mass calibration using narrow-distribution polymethyl methacrylate.

Example 4

Elastollan® C 80 A 10 pellets were mixed with pellets of concentrate No. 1 and concentrate No. 4 and these pellet mixtures were processed in a customary manner by injection molding to produce test plates, the test plates were heat treated at 100° C. for 20 hours and the mechanical properties were determined.

To test the storage stability of such isocyanate-rich concentrates, a comparable mixing trial using Elastollan® C 80 A 10 was carried out after storage of concentrate No. 4 for four months.

The results are described in table 3.

TABLE 3

| Property | Unit | Test method | Concentrate No. 1 | | | | Concentrate No. 4 | | | | Concentrate No. 4 after storage for 4 months | | | |
|---|---|---|---|---|---|---|---|---|---|---|---|---|---|---|
| | | | \multicolumn{12}{c}{Proportion in the mixture (% by weight)} | | | | | | | | | | | |
| | | | 0 | 4 | 5 | 6 | 8 | 4 | 5 | 6 | 8 | 4 | 5 | 6 | 8 |
| Hardness | Shore | DIN 53 505 | 83 A | 84 A | 84 A | 84 A | 84 A | 82A | 83 A | 83 A | 84 A | 83 A | 84 A | 84 A | 85 A |
| Density | g/cm³ | DIN EN ISO 1183-1 | 1.181 | 1.182 | 1.184 | 1.185 | 1.186 | 1.184 | 1.184 | 1.184 | 1.186 | 1.184 | 1.184 | 1.184 | 1.186 |
| Tensile strength | MPa | DIN 53 504 | 47 | 48 | 50 | 52 | 51 | 50 | 51 | 56 | 51 | 48 | 49 | 51 | 48 |
| Elongation at break | % | DIN 53 504 | 620 | 560 | 550 | 530 | 540 | 520 | 520 | 540 | 500 | 540 | 510 | 500 | 490 |

TABLE 3-continued

| Property | Unit | Test method | Concentrate No. 1 | | | | | Concentrate No. 4 | | | | | Concentrate No. 4 after storage for 4 months | | | |
|---|---|---|---|---|---|---|---|---|---|---|---|---|---|---|---|---|
| | | | \multicolumn{12}{c}{Proportion in the mixture (% by weight)} | | | | | | | | | |
| | | | 0 | 4 | 5 | 6 | 8 | 4 | 5 | 6 | 8 | 4 | 5 | 6 | 8 |
| Abrasion | mm³ | DIN 53 516 | 32 | 30 | 31 | 32 | 30 | 28 | 30 | 32 | 30 | 30 | 32 | 29 | 33 |
| Compression set | | | | | | | | | | | | | | | |
| 72 h/23° C. | % | DIN ISO 815 | 19 | 17 | 18 | 19 | 19 | 17 | 16 | 16 | 20 | 20 | 17 | 18 | 18 |
| 24 h/70° C. | | | 31 | 29 | 26 | 27 | 25 | 26 | 21 | 21 | 20 | 26 | 26 | 26 | 24 |
| 24 h/100° C. | | | 55 | 50 | 47 | 39 | 39 | 44 | 40 | 38 | 37 | 48 | 45 | 43 | 41 |
| Vicat A 120 | ° C. | DIN EN ISO 306 | 110 | 125 | 130 | 134 | 136 | 129 | 130 | 132 | 136 | 125 | 126 | 127 | 133 |

The changes in the mechanical properties resulting from addition of the isocyanate concentrates are a reduction in the elongation at break, a decrease in the compression set values, in particular at 100° C., and an increase in the heat distortion resistance, measured by the VICAT A 120 value.

These effects are based on crosslinking of the Elastollan® C 85 A 10 resulting from addition of isocyanate.

Furthermore, comparison of the effects of concentrate No. 4 and concentrate No. 4 after storage for 4 months showed that the thermoplastic polyurethanes (i) of the invention will keep without loss of effectiveness when stored correctly.

Example 5

Elastollan® C 85 A 15 HPM pellets were mixed with concentrate No. 4, processed and tested in the same way as described in example 4.

TABLE 4

| Property | Unit | Test method | \multicolumn{5}{c}{Concentrate No. 4 Proportion (% by weight)} | | | | |
|---|---|---|---|---|---|---|---|
| | | | 0 | 4 | 5 | 6 | 8 |
| Hardness | Shore | DIN 53 505 | 84 A | 86 A | 86 A | 87 A | 87 A |
| Density | g/cm³ | DIN EN ISO 1183-1 | 1.194 | 1.196 | 1.196 | 1.198 | 1.198 |
| Tensile strength | MPa | DIN 53 504 | 35 | 41 | 43 | 43 | 45 |
| Elongation at break | % | DIN 53 504 | 750 | 730 | 680 | 640 | 600 |
| Abrasion | mm³ | DIN 53 516 | 40 | 35 | 33 | 30 | 34 |
| Compression set | | | | | | | |
| 72 h/23° C. | % | DIN ISO 815 | 15 | 17 | 18 | 16 | 18 |
| 24 h/70° C. | | | 25 | 28 | 26 | 27 | 23 |
| 24 h/100° C. | | | 50 | 42 | 45 | 43 | 46 |
| Vicat A 120 | ° C. | DIN EN ISO 306 | 120 | 134 | 136 | 138 | 142 |

The results show that the mode of action of the polyurethanes (i) of the invention on addition to TPU modified with hard phase are comparable with the effects when using TPU having a structure corresponding to the Elastollan® C grades.

Example 6

Concentrate No. 4 obtained as described in example 3 was fed as a pellet mixture with Elastollan® 1195 A and Elastollan® 1154 D into an extruder having a groove feed zone, process section length of 32 D and a barrier mixing part screw, melted, mixed and extruded as a tube. Extrudates having a smooth surface were obtained.

To determine the degree of crosslinking, Elastollan® 1195 A and 1154 D were extruded in the same way without addition of concentrate No. 4. About 4 g of the extrudates were stirred in 50 ml of dimethylformamide for 14 hours and the proportions of soluble material were subsequently determined.

TABLE 5

| Concentrate No. 4 Proportion in the mixture (% by weight) | Elastollan ® grade | Proportion of soluble material (% by weight) |
|---|---|---|
| 0 | 1195 A | 100% |
| 8 | 1195 A | 60% |
| 0 | 1154 D | 100% |
| 8 | 1154 D | 55% |

Example 7

Elastollan® 1174 D was processed in a customary manner by injection molding to produce plates. These plates were then printed using a thermotransfer color film (amine-comprising) for 2 minutes at 180° C. and cooled again. The plates prepared in this way were subsequently stored at 80° C. for 3 days. Diffusion of the dye of about 800 µm was determined on cross sections of these plates by means of optical microscopy. The printed image was blurred after the hot storage.

Example 8

Elastollan® 1174 D with addition of 5% of concentrate No. 4 obtained as described in example 3 was likewise processed as a pellet mixture by injection molding to produce plates, printed using thermotransfer color film and stored at 80° C. for 3 days in the same way as described in example 7.

Diffusion of the dye of about 300 µm was determined on cross sections of these plates by means of optical microscopy. The printed image was sharp and had not run even after hot storage.

Example 9

Ultramid® B3, viz. a polyamide 6 from BASF, was shaped on a two-component injection molding machine to produce a plate having dimensions of 4×65×130 mm and Elastollan® C 78 A 10 as soft component was subsequently injected onto this hard Ultramid® B3 plate so that the two equal-sized plates were joined to one another over the cross-sectional area of 4×130 mm. Test bars S1 in accordance with DIN 53 504 were milled from these plates so that the interface was precisely in the middle of the S1 bar.

The tensile strength, i.e. the bond strength between Ultramid® B3 and Elastollan® C 78 A 10, was then tested in accordance with DIN 53 504.

The same procedure was also carried out for pellet blends of Elastollan® C 78 A 10 and concentrate No. 4 as soft component for injection onto Ultramid® B3.

TABLE 6

| | Bond strength (MPa) | |
|---|---|---|
| Soft component | not heat treated | heat treated at 100° C./20 h |
| C 78 A 10 without additive | 7.5 | 10.0 |
| C 78 A 10 + 1% of concentrate No. 4 | 8.0 | 10.8 |
| C 78 A 10 + 2% of concentrate No. 4 | 8.5 | 11.5 |
| C 78 A 10 + 3% of concentrate No. 4 | 9.2 | 13.5 |
| C 78 A 10 + 4% of concentrate No. 4 | 9.6 | 16.7 |

As can be seen from the results, bond strengths of a composite of hard polyamide 6 and soft TPU can be significantly improved by addition of the thermoplastic polyurethanes (i) of the invention. Similar increases can be achieved when polybutylene terephthalate, polyethylene terephthalate, polycarbonate, ABS plastics, etc., are used as hard component.

What is claimed is:

1. A process for producing a thermoplastic polyurethane (i) comprising from 20% by weight to 70% by weight of isocyanate dissolved in the thermoplastic polyurethane, based on the total weight of the thermoplastic polyurethane (i) comprising the isocyanates, comprising melting the thermoplastic polyurethane at a temperature of 170 to 240° C., melting the isocyanate at a temperature of 20 to 80° C. and subsequently incorporating the isocyanate into said melt so that the resulting mixture has a temperature in the range of from 120 to 160° C. wherein said isocyanate and said thermoplastic polyurethane are not reacted together.

2. The process of claim 1, wherein the isocyanate is incorporated into the thermoplastic polyurethane by means of an extruder.

3. The process of claim 2, wherein the isocyanate is incorporated into the thermoplastic polyurethane by means of a twin-screw extruder.

4. The process of claim 2, wherein the product obtained from the extruder is cooled in a water bath immediately after leaving the die of the extruder and the strand obtained is subsequently pelletized.

5. The process of claim 2, wherein the product obtained from the extruder is extruded through a multihole dye directly from the extruder into a water bath and is subsequently cut up by means of a rotating knife.

6. The process of claim 1, wherein the NCO content of the thermoplastic polyurethane (i) comprising the isocyanate is greater than 5%.

7. The process of claim 1, wherein diphenylmethane 2,2'-, 2,4'- and/or 4,4'-diisocyanate (MDI), a carbodiimide-modified diphenylmethane 2,2'-, 2,4'- and/or 4,4'-diisocyanate (MDI), a prepolymer based on diphenylmethane 2,2'-, 2,4'- and/or 4,4'-diisocyanate (MDI), isocyanates comprising biuret and/or isocyanurate groups are present as isocyanate in the thermoplastic polyurethane (i).

8. The process of claim 1 wherein carbodiimide-modified diphenylmethane 4,4'-diisocyanate (MDI), prepolymer based on ethylene oxide/propylene oxide and/or trimerized hexamethylene diisocyanate are present as isocyanate in the thermoplastic polyurethane (i).

9. The process of claim 1, wherein the thermoplastic polyurethane in which the isocyanate is dissolved has a Shore hardness of from 80 A to 60 D before incorporation of the isocyanate.

10. A process for producing polyurethanes which comprises producing a thermoplastic polyurethane (i) comprising from 20% by weight to 70% by weight of isocyanate dissolved in the thermoplastic polyurethane, based on the total weight of the thermoplastic polyurethane (i) comprising the isocyanates, comprising melting the thermoplastic polyurethane at a temperature of 170 to 240° C., melting the isocyanate at a temperature of 20 to 80° C. and subsequently incorporating the isocyanate into said melt so that the resulting mixture has a temperature in the range of from 120 to 160° C. wherein said isocyanate and said thermoplastic polyurethane are not reacted together ; and reacting (a) said isocyanate in the presence of said thermoplastic polyurethanes (i) with (b) a compound which is reactive toward isocyanates.

11. A process for reacting a thermoplastic polyurethane with isocyanate, which comprises producing a thermoplastic polyurethane (i) comprising from 20% by weight to 70% by weight of isocyanate dissolved in the thermoplastic polyurethane, based on the total weight of the thermoplastic polyurethane (i) comprising the isocyanates, comprising melting the thermoplastic polyurethane at a temperature of 170 to 240° C., melting the isocyanate at a temperature of 20 to 80° C. and subsequently incorporating the isocyanate into said melt so that the resulting mixture has a temperature in the range of from 120 to 160° C. wherein said isocyanate and said thermoplastic polyurethane are not reacted together; and wherein said thermoplastic polyurethane (i) comprising isocyanates is used as isocyanate.

12. The process of claim 11, wherein from 1 to 70 parts by weight of said thermoplastic polyurethane (i) comprising isocyanates are used per 100 parts by weight of thermoplastic polyurethane.

13. The process of claim 11, wherein the thermoplastic polyurethane (i) is introduced into an extruder and melted together with the thermoplastic polyurethane.

14. The process of claim 11 which further comprises injection molding the thermoplastic polyurethane together with the thermoplastic polyurethane (i) comprising isocyanates.

15. The process claim 14, wherein thermoplastic polyurethane is injection molded by two-component injection molding together with a thermoplastic polyurethane (i) comprising from 20% by weight to 70% by weight of isocyanate dissolved in the thermoplastic polyurethane, based on the total weight of the thermoplastic polyurethane (i) comprising the isocyanates.

* * * * *